US009568963B2

(12) United States Patent
Farrow et al.

(10) Patent No.: US 9,568,963 B2
(45) Date of Patent: Feb. 14, 2017

(54) COMPUTER POWER SUPPLY ASSEMBLY

(71) Applicant: Lenovo (Singapore) Pte. Ltd., Singapore (SG)

(72) Inventors: Timothy Samuel Farrow, Cary, NC (US); Ali Kathryn Ent, Garner, NC (US); Shuang Li, Shenzhen (CN); Albert Vincent Makley, Morrisville, NC (US); Sean Hilliard, Anderson, SC (US); John David Swansey, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 14/229,886

(22) Filed: Mar. 29, 2014

(65) Prior Publication Data

US 2015/0277516 A1     Oct. 1, 2015

(51) Int. Cl.
*G06F 1/18*     (2006.01)
*G06F 1/20*     (2006.01)

(52) U.S. Cl.
CPC .............. *G06F 1/188* (2013.01); *G06F 1/181* (2013.01); *G06F 1/20* (2013.01)

(58) Field of Classification Search
CPC ........... G06F 1/181; G06F 1/184; G06F 1/18; G06F 1/187; G06F 1/188; H05K 7/1411; E05B 7/00; E05C 3/06; E05C 5/00; G11B 33/127; Y10T 292/1077; Y10T 292/1083; Y10T 292/57
USPC .............. 361/727, 679.31, 679.37, 726, 732; 292/197, 202, 336.3; 312/221, 223.1, 312/332.1
See application file for complete search history.

(56) References Cited

U.S. PATENT DOCUMENTS

| | | | | |
|---|---|---|---|---|
| 5,791,753 A * | 8/1998 | Paquin | ................. | H05K 7/1411 312/223.1 |
| 6,137,684 A * | 10/2000 | Ayd | ..................... | H05K 7/1411 361/608 |
| 6,693,798 B1 * | 2/2004 | Conn | ...................... | G06F 1/184 361/747 |
| 7,054,155 B1 * | 5/2006 | Mease | ................ | H05K 7/20581 165/104.34 |
| 7,104,830 B1 * | 9/2006 | Diaz | .................. | H01R 13/6395 439/347 |
| 7,175,470 B2 * | 2/2007 | Kangas | ................ | H05K 7/1411 439/160 |
| 7,354,293 B2 * | 4/2008 | Liang | ................... | H05K 7/1411 361/727 |
| 7,517,160 B2 * | 4/2009 | Miyoshi | ............... | G02B 6/4201 385/53 |
| 7,800,894 B2 * | 9/2010 | Davis | ................... | G11B 33/127 361/679.33 |

(Continued)

*Primary Examiner* — Courtney Smith
*Assistant Examiner* — Michael Matey
(74) *Attorney, Agent, or Firm* — Brian J. Pangrle

(57) ABSTRACT

A system can include a chassis that includes a keeper; a board coupled to the chassis where the board includes a power receipt connector and at least one processor electrically coupled to the power receipt connector; a power supply unit that includes a power supply connector; and a pivotable member coupled to the power supply unit where the pivotable member includes a handle portion and a latch portion that, in a latched orientation, engages the keeper and secures the power supply connector to the power receipt connector. Various other apparatuses, systems, methods, etc., are also disclosed.

21 Claims, 10 Drawing Sheets

(56) References Cited

U.S. PATENT DOCUMENTS

| | | | |
|---|---|---|---|
| 8,231,396 B2* | 7/2012 | Kangas | H05K 7/1411 361/727 |
| 9,146,366 B2* | 9/2015 | Koutrokois | G02B 6/4246 |
| 2002/0104396 A1* | 8/2002 | Megason | F16H 51/00 74/109 |
| 2003/0099094 A1* | 5/2003 | Coles | H05K 7/20172 361/726 |
| 2006/0002093 A1* | 1/2006 | Carlson | G11B 33/128 361/726 |
| 2008/0062637 A1* | 3/2008 | Chang | G06F 1/20 361/679.54 |
| 2011/0255241 A1* | 10/2011 | Wu | G06F 1/181 361/679.54 |
| 2012/0275120 A1* | 11/2012 | Nguyen | G02B 6/4292 361/747 |
| 2013/0210275 A1* | 8/2013 | Fish | H01R 13/6658 439/620.01 |
| 2015/0186325 A1* | 7/2015 | Petrick | G06F 13/4027 710/313 |

* cited by examiner

COMPUTER POWER SUPPLY ASSEMBLY

TECHNICAL FIELD

Subject matter disclosed herein generally relates to technology for a computing system.

COPYRIGHT NOTICE

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

BACKGROUND

A computing system can include various components such as a processor, memory and a power supply unit. A power supply unit may be positioned in a housing of a computing system.

SUMMARY

A system can include a chassis that includes a keeper; a board coupled to the chassis where the board includes a power receipt connector and at least one processor electrically coupled to the power receipt connector; a power supply unit that includes a power supply connector; and a pivotable member coupled to the power supply unit where the pivotable member includes a handle portion and a latch portion that, in a latched orientation, engages the keeper and secures the power supply connector to the power receipt connector. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
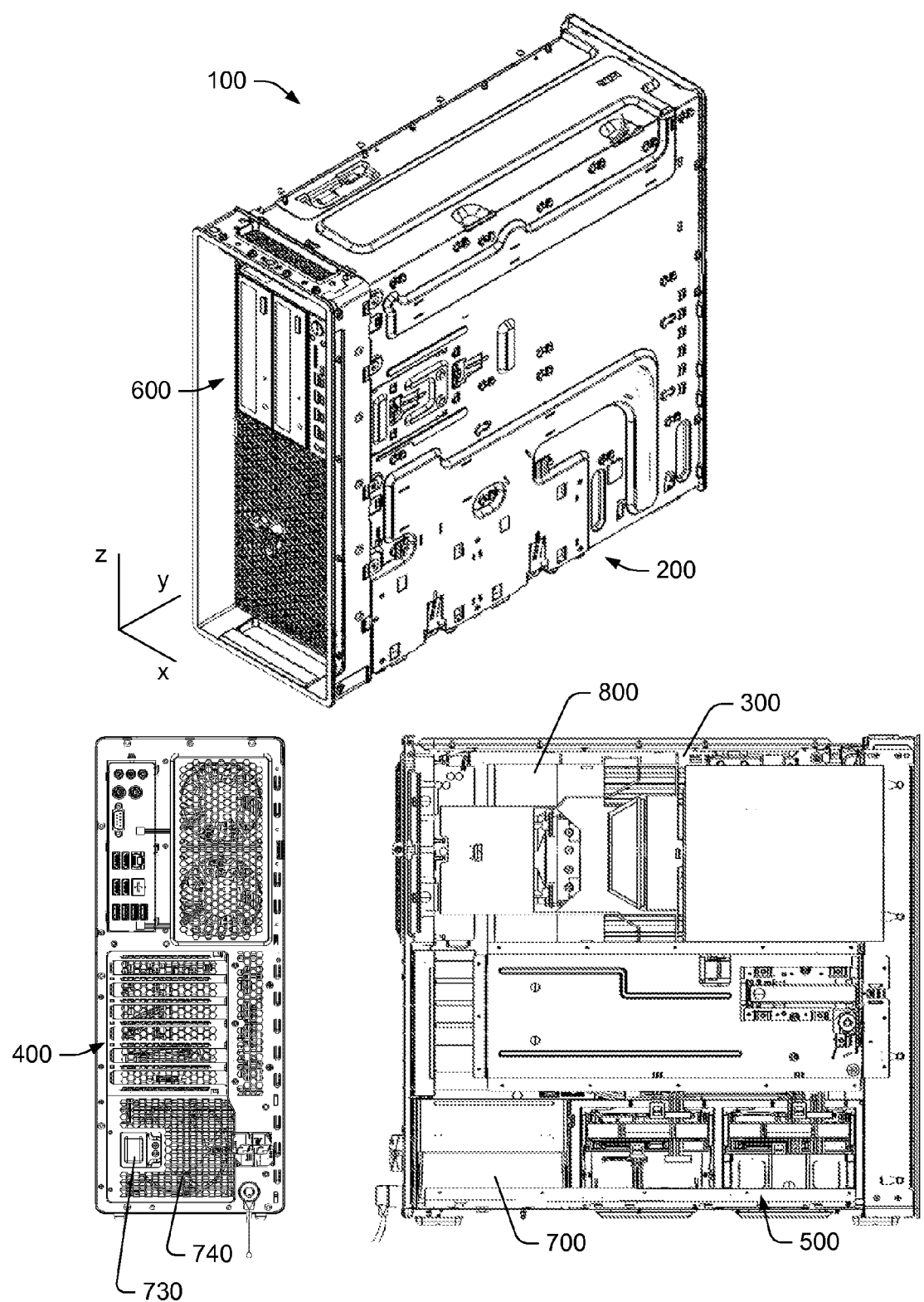
FIG. 1 is a series of diagrams of views of an example of a computing system.

FIG. 1 shows an example of a computing system 100. As an example, the computing system 100 may be a workstation, for example, configured to handle information, which may include one or more of processing information, storing information, receiving information and transmitting information. The computing system 100 can include connectors 190, for example, to connect the computing system 100 to one or more peripherals, networks, etc. As an example, the computing system 100 may include wireless circuitry for wireless connection to one or more peripherals, networks, etc.

As shown in the example of FIG. 1, the computing system includes 100 includes a chassis 200, a board 300, slots 400, bays 500, bays 600, a power supply assembly 700 and air flow features 800. As an example, a cover may be fitted to the chassis 200, which may include one or more panels. As an example, a panel may be a lockable panel where, in an unlocked state, it may be removed for access to various components in the computing system 100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 200.

In the example of FIG. 1, the computing system 100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 100 may be oriented on its bottom end where gravity may be aligned with the z-axis or, for example, the computing system 100 may be oriented on one of its sides where gravity may be aligned with the x-axis (e.g., with the left side facing upward and the right side facing downward).

In the example of FIG. 1, the chassis 200 includes a mechanism for limiting movement of the board 300 (e.g., at least along the y-axis). As shown, the board 300 may be positioned substantially in a y,z-plane and may include various slots 400 for receipt of one or more components (e.g., cards, etc.), which may extend outwardly from the board 300 (e.g., at least in part along the x-axis).

As to the bays 500 and the bays 600, these may be defined at least in part by the chassis 200. As shown, the bays 500 and the bays 600 may include one or more bays accessible via the front end of the computing system 100 (see, e.g., the bays 600) and may include one or more bays accessible via one or both of the sides of the computing system 100 such as, for example, the left side of the computing system 100 (see, e.g., the bays 500).

In the example of FIG. 1, the computing system 100 includes the power supply assembly 700, which includes a connector 730 for receipt of power (e.g., via a power cord) and which may include a fan 740 (e.g., or fans). The power supply assembly 700 may provide power to various components of the computing system 100.

As shown in the example of FIG. 1, the chassis 200 includes various openings that may facilitate flow of air. In operation, the front end and the back end of the computing system 100 may be positioned with respective clearances from other environmental structures (e.g., shelves, desks, walls, equipment, etc.), for example, to not unduly hinder flow of air. Air flow through the computing system 100 may be guided by one or more of the air flow features 800. As an example, the computing system 100 may include one or more baffles. As an example, the computing system 100 may include one or more fans. As an example, fans may be operated in series, for example, where air moved by one fan includes air moved by another fan. For example, a fan disposed in a first x,z-plane of the computing system 100 may move air at least in part along the y-axis (e.g., into the computing system 100) where another fan disposed in a second x,z-plane of the computing system 100 receives at least a portion of that air and moves it at least in part along the y-axis (e.g., out of the computing system 100). As mentioned, the power supply assembly 700 may include the fan 740 (e.g., or fans).

In the example of FIG. 1, the board 300 of the computing system 100 can include one or more processors and memory accessible by at least one of the one or more processors. One or more of the bays 500 and/or the bays 600 of the computing system 100 may include one or more storage devices, which may be accessible by at least one of the one or more processors.

Figure 2:
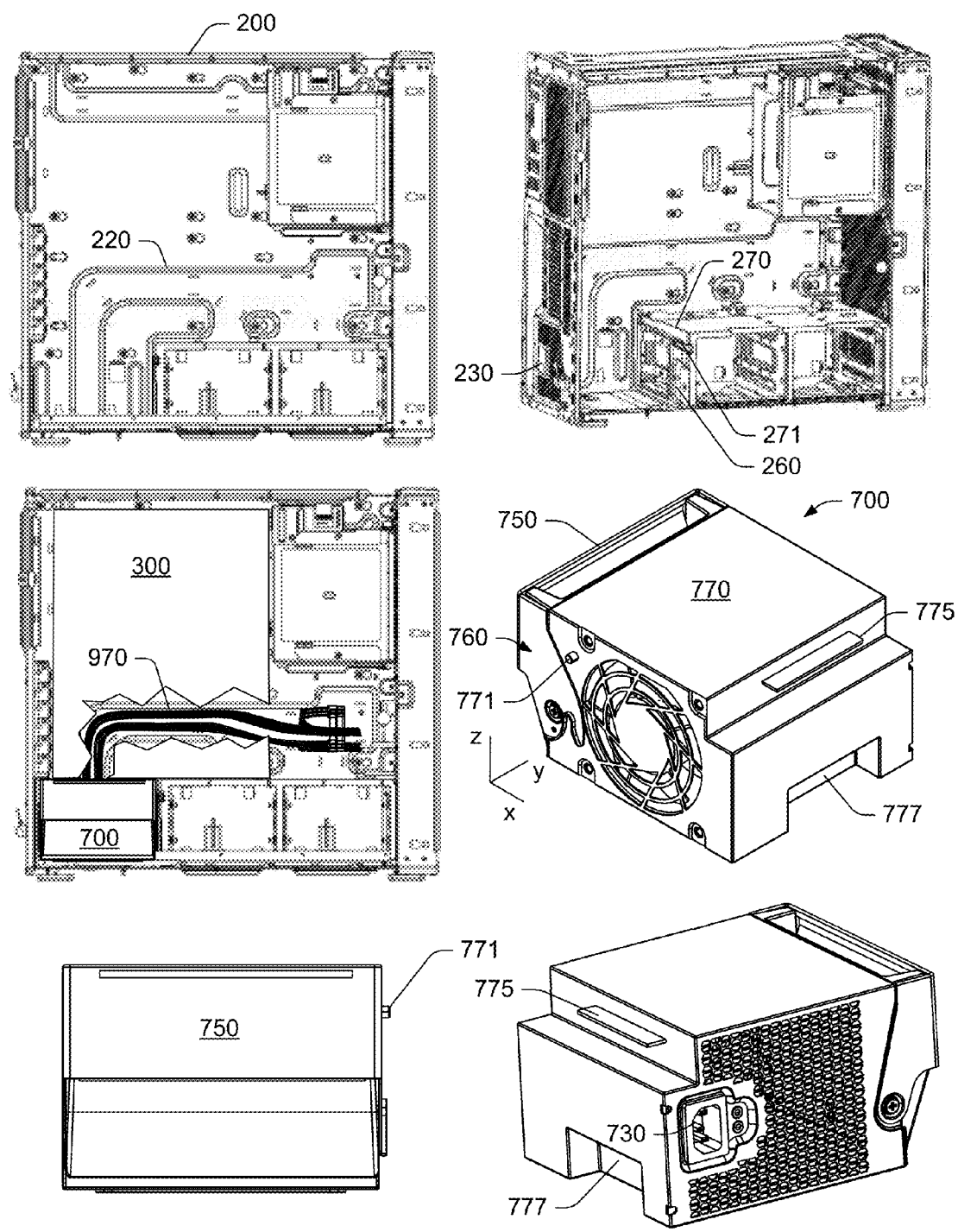
FIG. 2 is a series of diagrams of views of a portion of the computing system of FIG. 1 and an example of an assembly.

FIG. 2 shows a series of views of a portion of the computing system 100 of FIG. 1. For example, FIG. 2 shows the chassis as including a recess 220, an opening 230, a recess 260 defined by an internal chassis 270 that includes a guide 271. As shown, the board 300 may be operatively coupled to the chassis 200 where the power supply assembly 700 may be operatively coupled to the board 300 and to one or more cables 970, which may be disposed at least partially in the recess 220, for example, between the chassis 200 and a side of the board 300.

As shown in the example of FIG. 2, the power supply assembly 700 may include a socket 730 that may be positioned, for example, with respect to the opening 230 of the chassis 200 for receipt of a plug (e.g., of a cord that can supply electrical power to the power supply assembly 700). As shown, the power supply assembly 700 can include a member 750 and a power supply unit 770 where the member 750 may be operatively coupled to the power supply unit 770 and where the member 750 may include a latch portion 760, which may, for example, cooperate with the internal recess 260 as defined at least in part by the internal chassis 270. As shown, the power supply unit 770 may include a guide post 771, for example, that cooperates with the guide 271 of the internal chassis 270. As shown in the example of FIG. 2, the power supply assembly 700 may include one or more connectors 775 and 777.

FIG. 2 shows a side view of the chassis 200 where the power supply assembly 700 is received between a back end of the chassis 200 and a wall of the internal chassis 270. In such an example, the connector 775 may be a power supply connector that can be operatively coupled to a power receipt connector, which may be, for example, mounted to the board 300. In such a manner, power may be supplied from the power supply assembly 700 to one or more components of the board 300, for example, without an intervening cable (e.g., a cable with two ends that is disposed between the connector 775 and a connector of the board 300). As an example, an assembly may be a cable-less assembly for supply of power from a power supply unit to a board such as a motherboard of a computing system.

In the example of FIG. 2, the connector 777 of the power supply unit 770 may be operatively coupled to one or more cables 970, for example, to supply power to one or more components of a computing system (see, e.g., the computing system 100 of FIG. 1).

Figure 3:
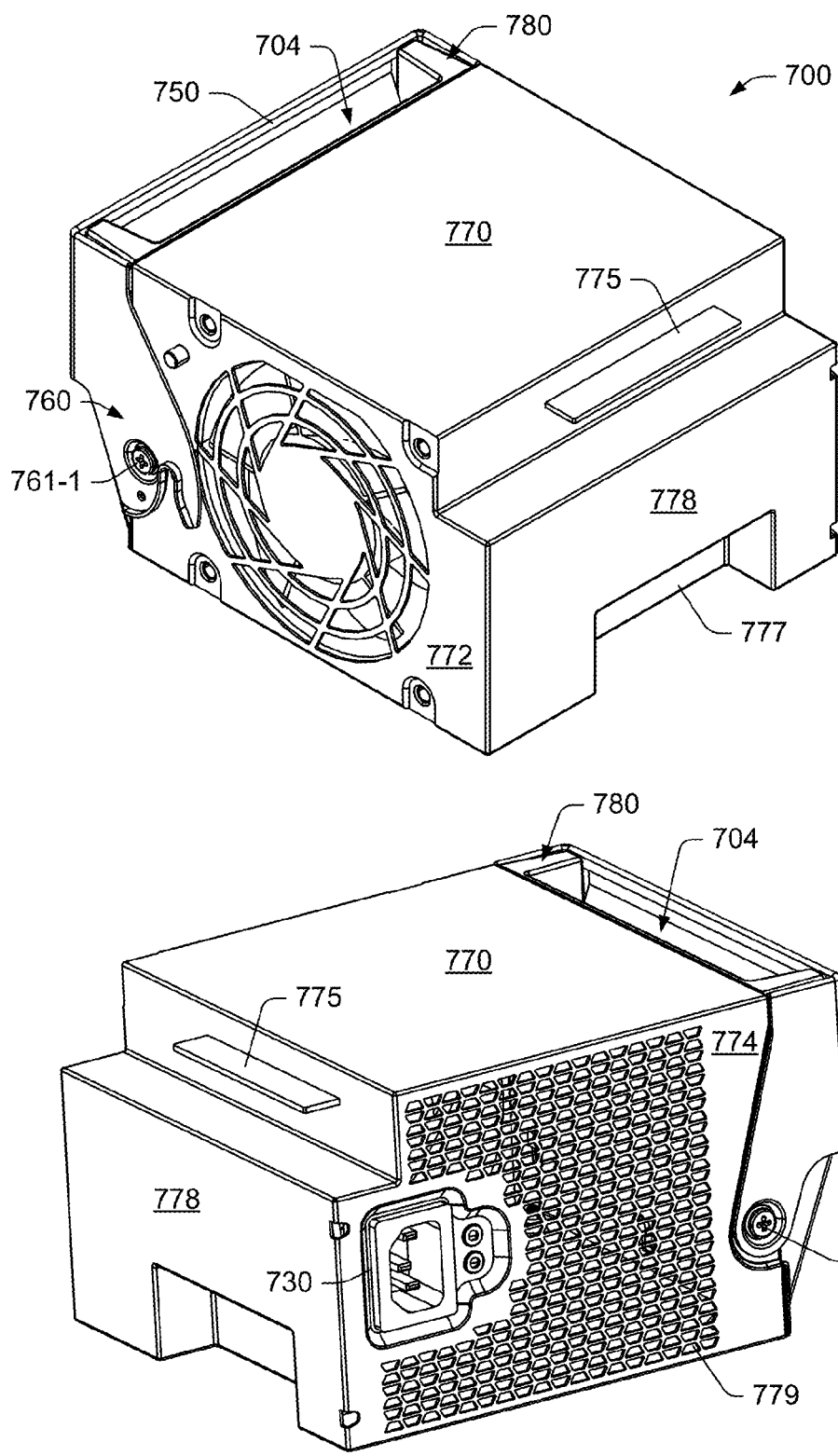
FIG. 3 is a series of diagrams of a views of the assembly of FIG. 2.

FIG. 3 shows two perspective views of the power supply assembly 700 where the power supply unit 770 includes a side 772, a side 774 and a back side 778 where the side 774 can include air flow openings 779. As shown in the example of FIG. 3, the power supply assembly 700 includes the member 750 and a panel 780, which are both operatively coupled to the power supply unit 770. As an example, the member 750 may be coupled to the power supply unit 770 via one or more screws 761-1 and 761-2 (e.g., machine screws, bolts, etc.). In such an example, the one or more screws 761-1 and 761-2 may act as axels that define a pivot axis for pivoting of the member 750, which may be a pivotable member.

In a closed orientation, the member 750 and the panel 780 may define a recess 704, which may be dimensioned for receipt of one or more fingers of a hand. For example, a person may insert a finger or fingers into the recess 704 and apply force sufficient to pivot the member 750 about a pivot axis. In such an example, pivoting of the member 750 may cause the latch portion 760 to bias a surface that defines a recess such as, for example, a surface of the internal recess 260 shown in FIG. 2. Accordingly, force applied to the member 750 that pivots the member 750 may cause the latch portion 760 to apply force to a surface such that the power supply assembly 700 moves (e.g., translates, etc.). Such force may be sufficient, for example, to cause the connector 775 to disconnect from another connector (e.g., which may be optionally mounted to a board).

In the example of FIG. 3, the latch portion 760 is shown as being on a single side of the member 750; noting that a member may optionally include multiple latch portions. As an example, a pivotable member may be pivoted about a pivot axis in a manner to move a power supply assembly whereby such movement causes one or more connectors of the power supply assembly to disconnect from one or more other connectors.

Figure 4:
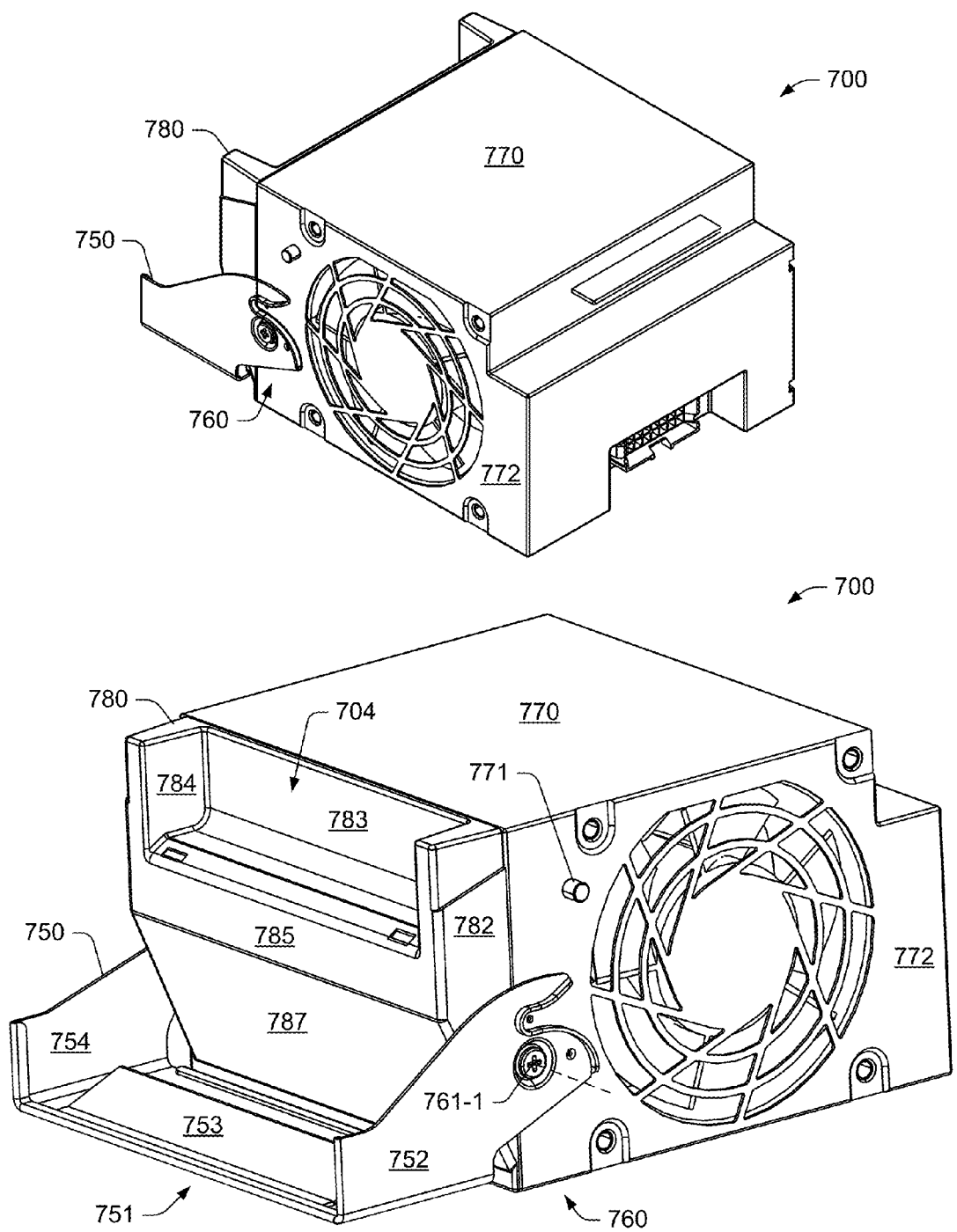
FIG. 4 is a series of diagrams of a views of the assembly of FIG. 2.

FIG. 4 shows two perspective views of the power supply assembly 700 with the member 750 in an open orientation. As shown in FIG. 4, the member 750 includes a handle portion 751, which may be defined by side walls 752 and 754 together with a cross-member 753, which may be or include a grip. For example, as shown, the cross-member 753 includes a portion that is oriented at an angle such that a finger or fingers of a hand may grip a back side thereof for application of force (e.g., directed frontwards).

As shown in the example of FIG. 4, the panel 780 may include side walls 782 and 784, a back wall 783 and one or more front walls 785 and 787. As an example, the recess 704 may be defined by the side walls 782 and 784 and the back wall 783 of the panel 780 and the cross-member 753 of the member 750 (e.g., when the member 750 is in a closed orientation).

Figure 5:
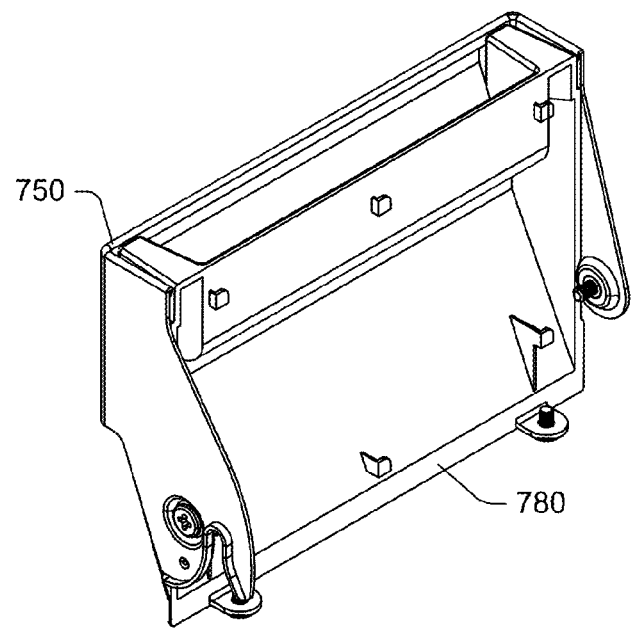
FIG. 5 is a series of diagrams of views of a portion of the assembly of FIG. 2.
Figure 5:
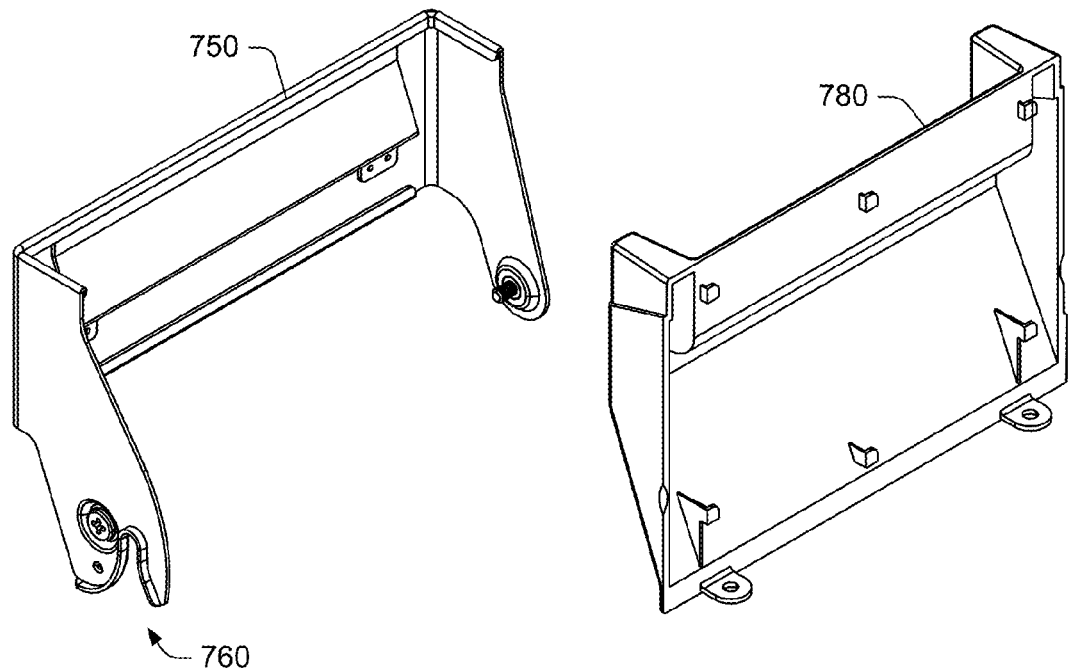

FIG. 5 shows a series of perspective views of the member 750 and the panel 780. As shown, the panel 780 may include mounting features that may provide for mounting the panel 780 to a power supply unit such as the power supply unit 770.

Figure 6:
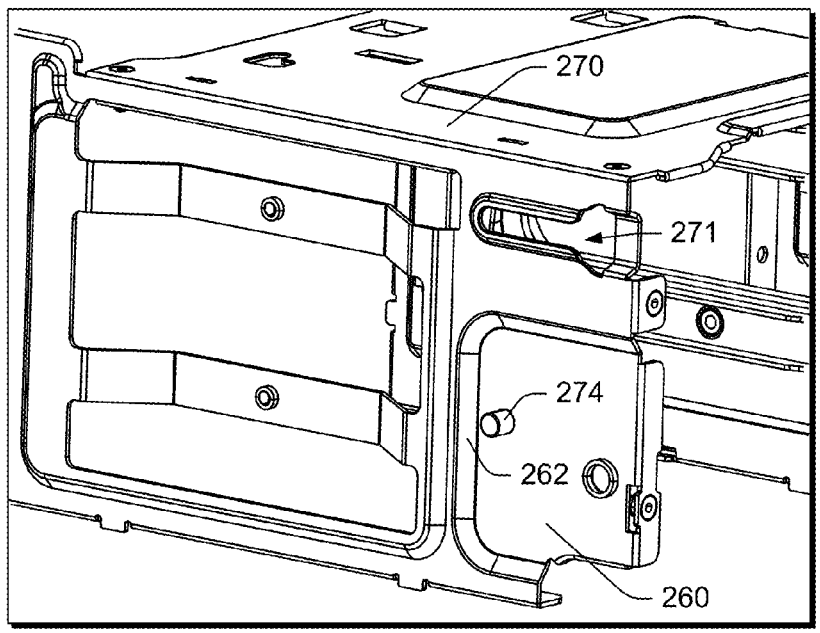
FIG. 6 is a series of diagrams of views of an example of a chassis with a keeper and an example of a pivotable member that includes a latch portion.
Figure 6:
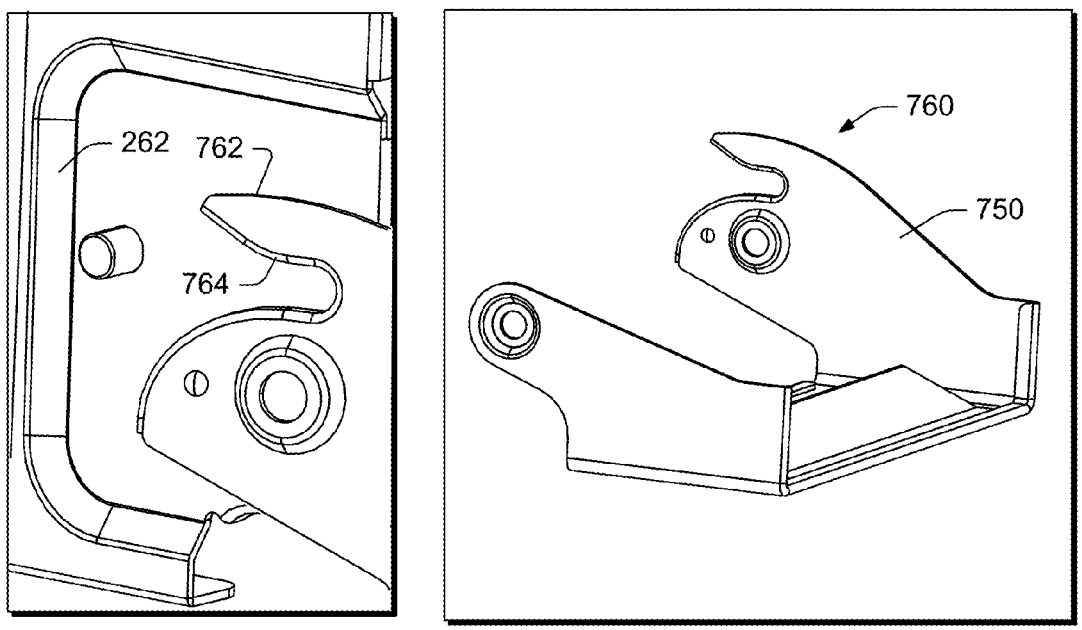

FIG. 6 shows a series of views of a portion of the internal chassis 270 with respect to the member 750. As shown, the internal chassis may include a post 274 disposed at least partially in the recess 260, which may be defined in part by a surface 262. For example, in FIG. 6, the post 274 extends at least partially into the recess 260.

As shown in the example of FIG. 6, the latch portion 760 of the member 750 can include a cam defined in part by a cam surface 762 and a groove defined in part by a groove surface 764. As an example, the recess 260 and/or the post 274 may act as a keeper, which may be part of a latching mechanism. For example, the recess 260 and the post 274 may be a keeper for at least a portion of the latch portion 760 of the member 750 where, for example, the member 750 may be a pivotable member that, upon pivoting, pivots the latch portion 760. In such an example, upon pivoting, the member 750 may in part translate. For example, the pivot axis of the member 750 may move inwardly with respect to the recess 260 for counter-clockwise rotation of the member 750 and the pivot axis of the member 750 may move outwardly with respect to the recess 260 for clockwise rotation of the member 750 (e.g., per the perspective views shown in FIG. 6). Thus, where the member 750 is operatively coupled to a power supply unit such as, for example, the power supply unit 770, the member 750 may act to translate the power supply unit 770 into and out of a power supply unit bay and, for example, to connect and disconnect, respectively, one or more connectors from one or more other connectors, which may include one or more fixed connector.

As an example, the surface 262 may be a bias surface that may be biased by movement of a cam such as the cam surface 762 of the latch portion 760 of the member 750. As an example, the surface 262 may be part of a chassis, which may be a wall, a component, etc., which may be fixed and rigid. For example, the surface 262 may be formed of stamped metal and of sufficient strength to withstand force applied thereto by a cam, for example, for purposes of moving a component to which the cam is operatively coupled (e.g., a power supply unit, etc.). As an example, the surface 262 may be a cam contact surface. As an example, a recess may be defined at least in part by a cam contact surface.

As an example, a power socket such as the power socket 730 of the power supply assembly 700 may intercooperate with a plug and a portion of a chassis such as the chassis 200. For example, a plug disposed in the socket 730 may prohibit or limit movement of the power supply assembly 700 due to contact between the plug and a portion of the opening 230 of the chassis 200. As an example, a clearance or clearances may be provided between various components such that upon transitioning the member 750 from a closed orientation (e.g., a closed state) to an open orientation (e.g., an open state), a plug that is plugged into the socket 730 may move inwardly with respect to the opening 230 of the chassis 200. In such an example, clearance or clearances may be sufficient to unplug the plug from the socket 730 from the back side of the chassis 200 (see, e.g., the computing system 100 of FIG. 1). As an example, a power supply assembly may be removable from and/or insertable into a chassis with a plug plugged into a socket of the power supply assembly. While a plug may infer a male component and a socket may infer a female component, as described herein, such gender-referenced features may be reversed (e.g., a plug may include one or more recesses and/or one or more prongs and/or a socket may include one or more prongs and/or may include one or more recesses, etc.). As an example, a plug and/or socket may include one or more magnets or other features.

Figure 7:
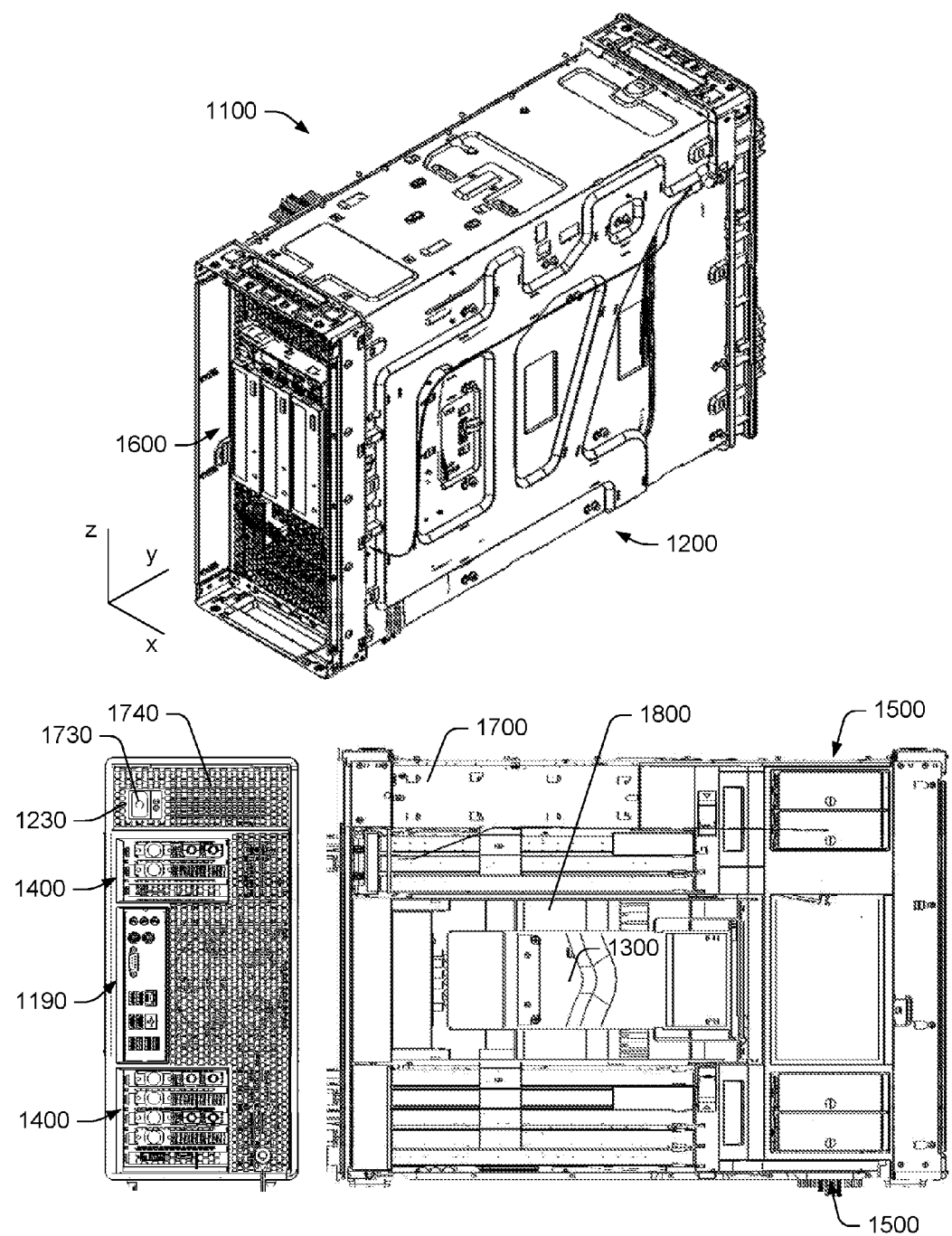
FIG. 7 is a series of diagrams of views of an example of a computing system.

FIG. 7 shows an example of a computing system 1100. As an example, the computing system 1100 may be a workstation, for example, configured to handle information, which may include one or more of processing information, storing information, receiving information and transmitting information. The computing system 1100 can include connectors 1190, for example, to connect the computing system 1100 to one or more peripherals, networks, etc. As an example, the computing system 1100 may include wireless circuitry for wireless connection to one or more peripherals, networks, etc.

As shown in the example of FIG. 7, the computing system includes 1100 includes a chassis 1200, a board 1300, slots 1400, bays 1500, bays 1600, a power supply unit 1700 and air flow features 1800. As an example, a cover may be fitted to the chassis 1200, which may include one or more panels. As an example, a panel may be a lockable panel where, in an unlocked state, it may be removed for access to various components in the computing system 1100. As an example, various components may be configured for tool-less installation and removal. As an example, a tool-less configuration may include one or more handles, grips, buttons, levers, etc. that may be manipulated by one or more fingers of a human hand (e.g., or hands). As an example, a tool-less configuration may include guides, for example, for sliding in and sliding out components with respect to the chassis 1200.

In the example of FIG. 7, the computing system 1100 is shown with respect to a Cartesian coordinate system (x, y, z) and as including a back end and a front end disposed substantially in respective x,z-planes, a top end and a bottom end disposed substantially in respective x,y-planes and a left side and a right side disposed substantially in respective y,z-planes. As to an orientation with respect to gravity, as an example, the computing system 1100 may be oriented on its bottom end where gravity may be aligned with the z-axis or, for example, the computing system 1100 may be oriented on one of its sides where gravity may be aligned with the x-axis (e.g., with the left side facing upward and the right side facing downward).

In the example of FIG. 7, the chassis 1200 includes a mechanism for limiting movement of the board 1300 (e.g., at least along the y-axis). As shown, the board 1300 may be positioned substantially in a y,z-plane and may include various slots 1400 for receipt of one or more components (e.g., cards, etc.), which may extend outwardly from the board 1300 (e.g., at least in part along the x-axis).

As to the bays 1500 and the bays 1600, these may be defined at least in part by the chassis 1200. As shown, the bays 1500 and the bays 1600 may include one or more bays accessible via the front end of the computing system 1100 (see, e.g., the bays 1600) and may include one or more bays accessible via one or both of the sides of the computing system 1100 such as, for example, the left side of the computing system 1100 (see, e.g., the bays 1500).

In the example of FIG. 7, the computing system 1100 includes the power supply assembly 1700, which includes a connector 1730 for receipt of power (e.g., via a power cord) and which may include a fan 1740 (e.g., or fans). The power supply assembly 1700 may provide power to various components of the computing system 1100.

As shown in the example of FIG. 7, the chassis 1200 includes various openings that may facilitate flow of air. In operation, the front end and the back end of the computing system 1100 may be positioned with respective clearances from other environmental structures (e.g., shelves, desks, walls, equipment, etc.), for example, to not unduly hinder flow of air. Air flow through the computing system 1100 may be guided by one or more of the air flow features 1800. As an example, the computing system 1100 may include one or more baffles. As an example, the computing system 1100 may include one or more fans. As an example, fans may be operated in series, for example, where air moved by one fan includes air moved by another fan. For example, a fan disposed in a first x,z-plane of the computing system 1100 may move air at least in part along the y-axis (e.g., into the computing system 1100) where another fan disposed in a second x,z-plane of the computing system 1100 receives at least a portion of that air and moves it at least in part along the y-axis (e.g., out of the computing system 1100). As mentioned, the power supply assembly 1700 may include the fan 1740 (e.g., or fans).

In the example of FIG. 7 the board 1300 of the computing system 1100 can include one or more processors and memory accessible by at least one of the one or more processors. One or more of the bays 1500 and/or the bays 1600 of the computing system 1100 may include one or more storage devices, which may be accessible by at least one of the one or more processors.

Figure 8:
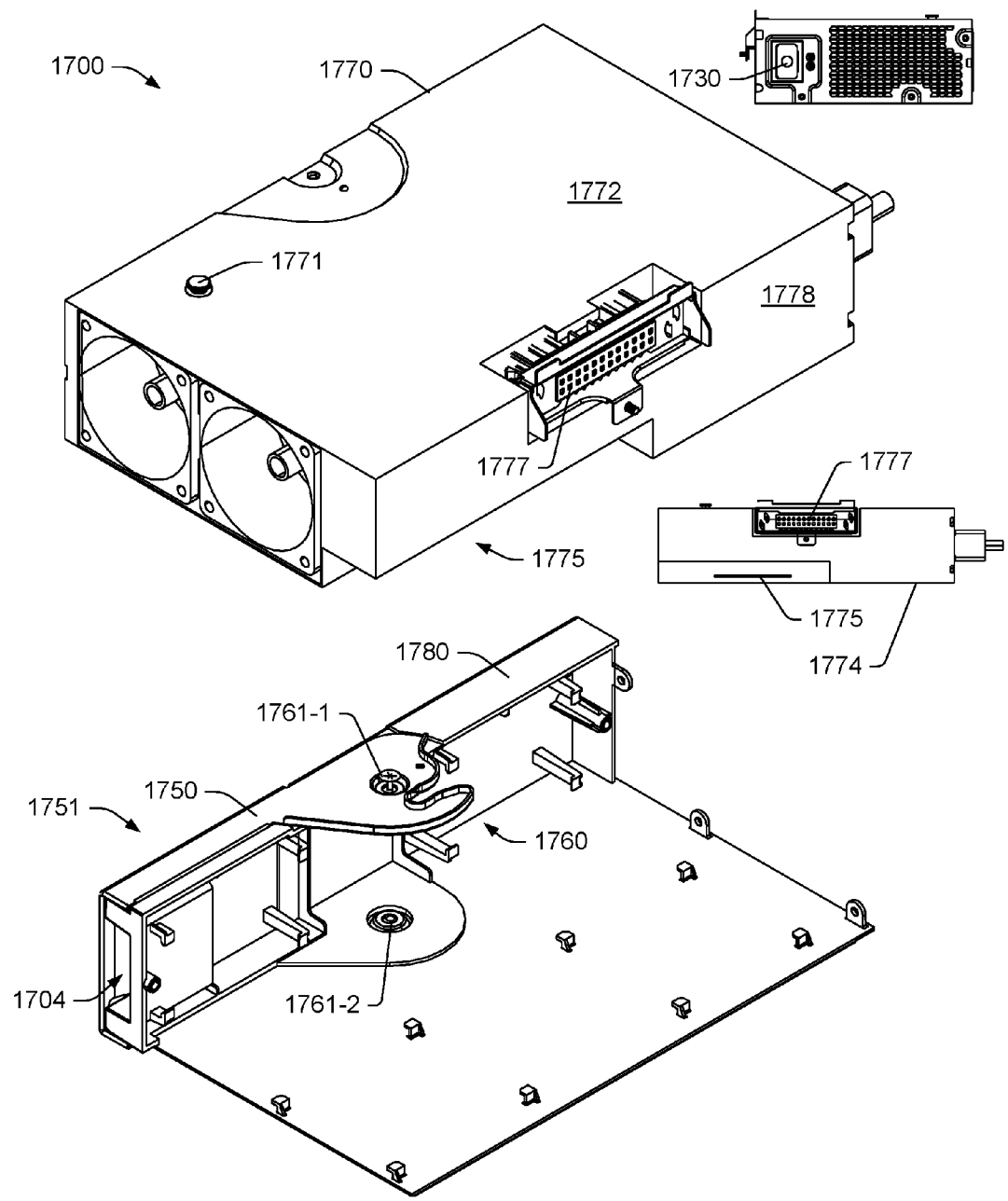
FIG. 8 is a series of diagrams of views of an example of an assembly.

FIG. 8 shows a series of views of a power supply assembly 1700, for example, as in the computing system 1100 of FIG. 7. As shown in the example of FIG. 8, the power supply assembly 1700 may include a socket 1730 that may be positioned, for example, with respect to the opening 1230 of the chassis 1200 for receipt of a plug (e.g., of a cord that can supply electrical power to the power supply assembly 1700). As shown, the power supply assembly 1700 can include a member 1750 and a power supply unit 1770 where the member 1750 may be operatively coupled to the power supply unit 1770 and where the member 1750 may include a latch portion 1760, which may, for example, cooperate with the internal recess as defined at least in part by a chassis. As shown, the power supply unit 1770 may include a guide post 1771, for example, that cooperates with the guide of a chassis. As shown in the example of FIG. 8, the power supply assembly 1700 may include one or more connectors 1775 and 1777.

As an example, the power supply assembly 1700 may be received between a back end of the chassis 1200 and an internal wall of the chassis 1200. In such an example, the connector 1775 may be a power supply connector that can be operatively coupled to a power receipt connector, which may be, for example, mounted to the board 1300. In such a manner, power may be supplied from the power supply assembly 1700 to one or more components of the board 1300, for example, without an intervening cable (e.g., a cable with two ends that is disposed between the connector 1775 and a connector of the board 1300). As an example, an assembly may be a cable-less assembly for supply of power from a power supply unit to a board such as a motherboard of a computing system.

In the example of FIG. 8, the connector 1777 of the power supply unit 1770 may be operatively coupled to one or more cables, for example, to supply power to one or more components of a computing system (see, e.g., the computing system 1100 of FIG. 7).

In the example of FIG. 8, the power supply unit 1770 includes a top wall 1772, a bottom wall 1774 and a back side 1778. As shown in the example of FIG. 8, the power supply assembly 1700 includes the member 1750 and a mount 1780, which may both be operatively coupled to the power supply unit 1770. As an example, the member 1750 may be coupled to the power supply unit 1770 via one or more screws 1761-1 and 1761-2 (e.g., machine screws, bolts, etc.). In such an example, the one or more screws 1761-1 and 1761-2 may act as axels that define a pivot axis for pivoting of the member 1750, which may be a pivotable member.

In a closed orientation, the member 1750 and the mount 1780 may define a recess 1704, which may be dimensioned for receipt of one or more fingers of a hand. For example, a person may insert a finger or fingers into the recess 1704 and apply force sufficient to pivot the member 1750 about a pivot axis. In such an example, pivoting of the member 1750 may cause the latch portion 1760 to bias a surface that defines a recess such as, for example, a surface of an internal recess in a computing system. Accordingly, force applied to the member 1750 that pivots the member 1750 may cause the latch portion 1760 to apply force to a surface such that the power supply assembly 1700 moves (e.g., translates, etc.). Such force may be sufficient, for example, to cause the connector 1775 to disconnect from another connector (e.g., which may be optionally mounted to a board).

In the example of FIG. 8, the latch portion 1760 is shown as being on a single side of the member 1750; noting that a member may optionally include multiple latch portions. As an example, a pivotable member may be pivoted about a pivot axis in a manner to move a power supply assembly whereby such movement causes one or more connectors of the power supply assembly to disconnect from one or more other connectors.

Figure 9:
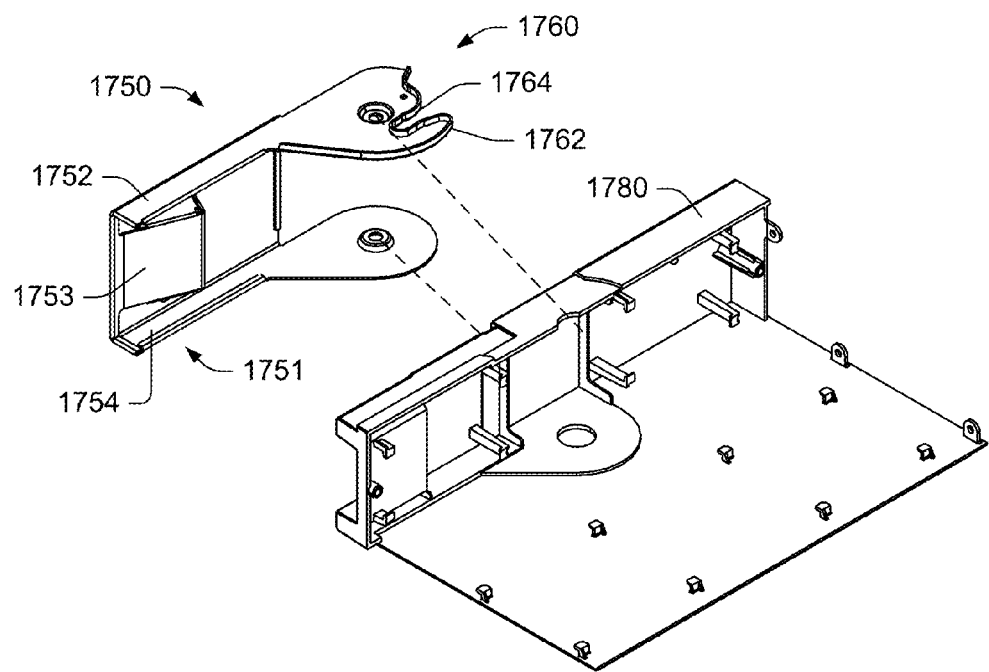
FIG. 9 is a series of diagrams of views of a portion of the assembly of FIG. 8.
Figure 9:
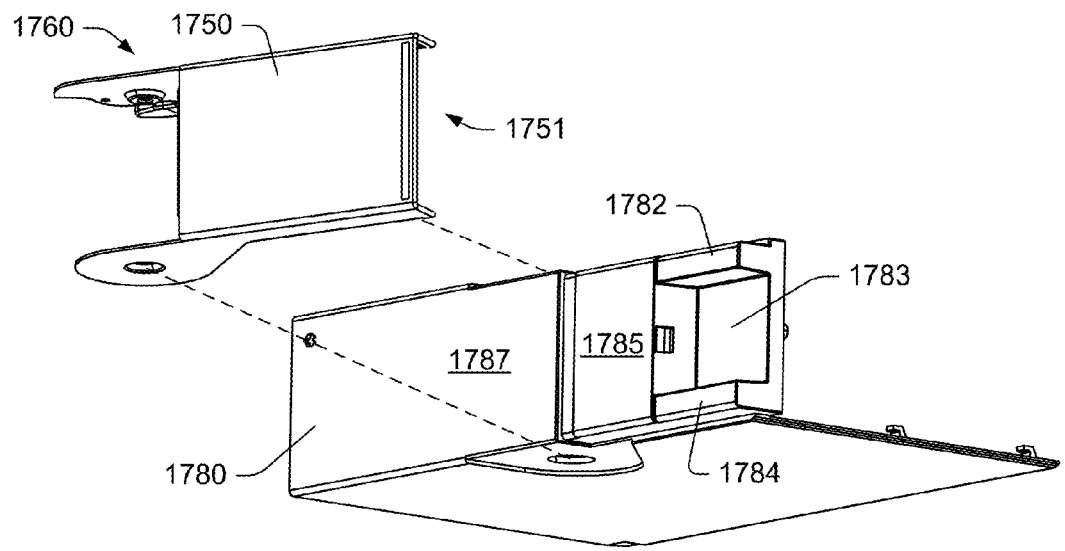

FIG. 9 shows two exploded perspective views of the member 1750 and the mount 1780. As shown in FIG. 9, the member 1750 includes a handle portion 1751, which may be defined by a top wall 1752 and a bottom wall 1754 together with a cross-member 1753, which may be or include a grip. For example, as shown, the cross-member 1753 includes a portion that is oriented at an angle such that a finger or fingers of a hand may grip a back side thereof for application of force (e.g., directed frontwards).

As shown in the example of FIG. 9, the mount 1780 may include a top wall 1782 and a bottom wall 1784, a back wall 1783 and one or more front walls 1785 and 1787. As an example, the recess 1704 may be defined by the walls 1782 and 1784 and the back wall 1783 of the mount 1780 and the cross-member 1753 of the member 1750 (e.g., when the member 1750 is in a closed orientation).

As an example, a chassis or a component thereof may include a post disposed at least partially in a recess, which may be defined in part by a surface (see, e.g., FIG. 6, where the post 274 extends at least partially into the recess 260).

As an example, the latch portion 1760 of the member 1750 can include a cam defined in part by a cam surface 1762 and a groove defined in part by a groove surface 1764. As an example, a recess and/or a post may act as a keeper, which may be part of a latching mechanism. For example, a recess and a post may be a keeper for at least a portion of a latch portion 1760 of the member 1750 where, for example, the member 1750 may be a pivotable member that, upon pivoting, pivots the latch portion 1760. In such an example, upon pivoting, the member 1750 may in part translate. For example, the pivot axis of the member 1750 may move inwardly with respect to the recess for rotation of the member 1750 in one direction (arc-wise) and the pivot axis of the member 1750 may move outwardly with respect to the recess for rotation of the member 1750 in an opposite direction (arc-wise). Thus, where the member 1750 is operatively coupled to a power supply unit such as, for example, the power supply unit 1770, the member 1750 may act to translate the power supply unit 1770 into and out of a power supply unit bay and, for example, to connect and disconnect, respectively, one or more connectors from one or more other connectors, which may include one or more fixed connector.

As an example, a surface may be a bias surface that may be biased by movement of a cam such as the cam surface 1762 of the latch portion 1760 of the member 1750. As an example, a surface may be part of a chassis, which may be a wall, a component, etc., which may be fixed and rigid. For example, a surface may be formed of stamped metal and of sufficient strength to withstand force applied thereto by a cam, for example, for purposes of moving a component to which the cam is operatively coupled (e.g., a power supply unit, etc.). As an example, a surface may be a cam contact surface. As an example, a recess may be defined at least in part by a cam contact surface.

As an example, a power socket such as the power socket 1730 of the power supply assembly 1700 may intercooperate with a plug and a portion of a chassis such as the chassis 1200. For example, a plug disposed in the socket 1730 may prohibit or limit movement of the power supply assembly 1700 due to contact between the plug and a portion of the opening 1230 of the chassis 1200. As an example, a clearance or clearances may be provided between various components such that upon transitioning the member 1750 from a closed orientation (e.g., a closed state) to an open orientation (e.g., an open state), a plug that is plugged into the socket 1730 may move inwardly with respect to the opening 1230 of the chassis 1200. In such an example, clearance or clearances may be sufficient to unplug the plug from the socket 1730 from the back side of the chassis 1200 (see, e.g., the computing system 1100 of FIG. 7). As an example, a power supply assembly may be removable from and/or insertable into a chassis with a plug plugged into a socket of the power supply assembly. While a plug may infer a male component and a socket may infer a female component, as described herein, such gender-referenced features may be reversed (e.g., a plug may include one or more recesses and/or one or more prongs and/or a socket may include one or more prongs and/or may include one or more recesses, etc.). As an example, a plug and/or socket may include one or more magnets or other features.

As an example, a system can include a chassis that includes a keeper; a board coupled to the chassis where the board includes a power receipt connector and at least one processor electrically coupled to the power receipt connector; a power supply unit that includes a power supply connector; and a pivotable member coupled to the power supply unit where the pivotable member includes a handle portion and a latch portion that, in a latched orientation, engages the keeper and secures the power supply connector to the power receipt connector. In such an example, the latch portion may include a cam and, for example, the chassis may include a cam contact surface.

As an example, a keeper may include a post. For example, a latch portion of a member may include a groove that, in the latched orientation of the latch portion of the member, receives the post.

As an example, a chassis may include a recess defined in part by a cam contact surface, for example, where a keeper includes a post that extends into the recess. As an example, a chassis may be an internal chassis (e.g., a chassis component of or within a chassis, etc.).

As an example, in the latched orientation of a member that includes a latch portion and a handle portion, a surface of the handle portion may define at least in part a finger insert recess. As an example, a handle portion may include a plane that, in a latched orientation of the handle, is substantially parallel to a planar wall of a power supply unit.

As an example, a power supply unit can include a power cable socket where, for example, a chassis may include an opening aligned with the power cable socket.

As an example, a power supply unit may include a fan that includes a fan rotational axis and a fan face where, for example, a chassis may include at least one air flow opening disposed an axial distance from the fan face.

As an example, a system may include a cover panel operatively coupled to a chassis where, in a closed orientation, the cover panel covers a pivotable member that may be pivoted for removal of a power supply unit where pivoting may optionally decoupled a power supply connector and a power receipt connector (e.g., which may be mounted to a board).

As an example, an assembly may include a mount that mounts a pivotable member to a power supply unit. As an example, as an example, a power supply unit may include a mount or mounting features that can pivotably couples a pivotable member to the power supply unit.

As an example, a power supply unit and a chassis may include a guide post and a guide slot that, in a latched orientation of a pivotable member operatively coupled to the power supply unit, receives the guide post.

As an example, a power receipt connector may include a slot and electrical contacts disposed at least partially in the slot. As an example, a power supply connector may include a plate and electrical contacts. As an example, a connector or connectors may be configured as an edge connector or edges connectors.

As an example, a power receipt connector may include a slot where, for example, a power supply connector includes a plate that, in a latched orientation of a pivotable member operatively coupled to a power supply unit that includes the power supply connector, is at least partially received by the slot.

As an example, a system can include a pivotable member with a latch portion and a handle portion where the latch portion of the pivotable member includes an unlatched orientation and a latched orientation where, in the unlatched orientation, the handle portion of the pivotable member extends outwardly away from a wall of a power supply unit and where clearance exists between electrical contact surfaces of a power supply connector and a power receipt connector. In such an example, the clearance may function as an electrical disconnect. As an example, a connector may move in a substantially linear direction responsive to pivoting of a member that includes a latch portion and at least one cam and at least one groove.

As an example, a post may be provided as a keeper or as part of a keeper to engage a surface of a latch portion of a pivotable member. In such an example, the latch portion may include a cam that can contact a cam contact surface, for example, to apply force upon pivoting of the pivotable member.

As an example, a system can include a chassis that includes a keeper; a board mounted to the chassis where the board includes a board power receipt connector; a processor mounted to the board and electrically coupled to the power receipt connector; memory accessible by the processor, mounted to the board and electrically coupled to the power receipt connector; graphics circuitry mounted to the chassis where the graphics circuitry includes a graphics power receipt connector; a power supply unit that includes a board power supply connector and a graphics power supply connector; and a pivotable member coupled to the power supply unit where the pivotable member includes a handle portion and a latch portion that, in a latched orientation, engages the keeper and secures the board power supply connector to the board power receipt connector. In such an example, the system may include a cable that extends from the graphics power supply connector to the graphics power receipt connector.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 10:
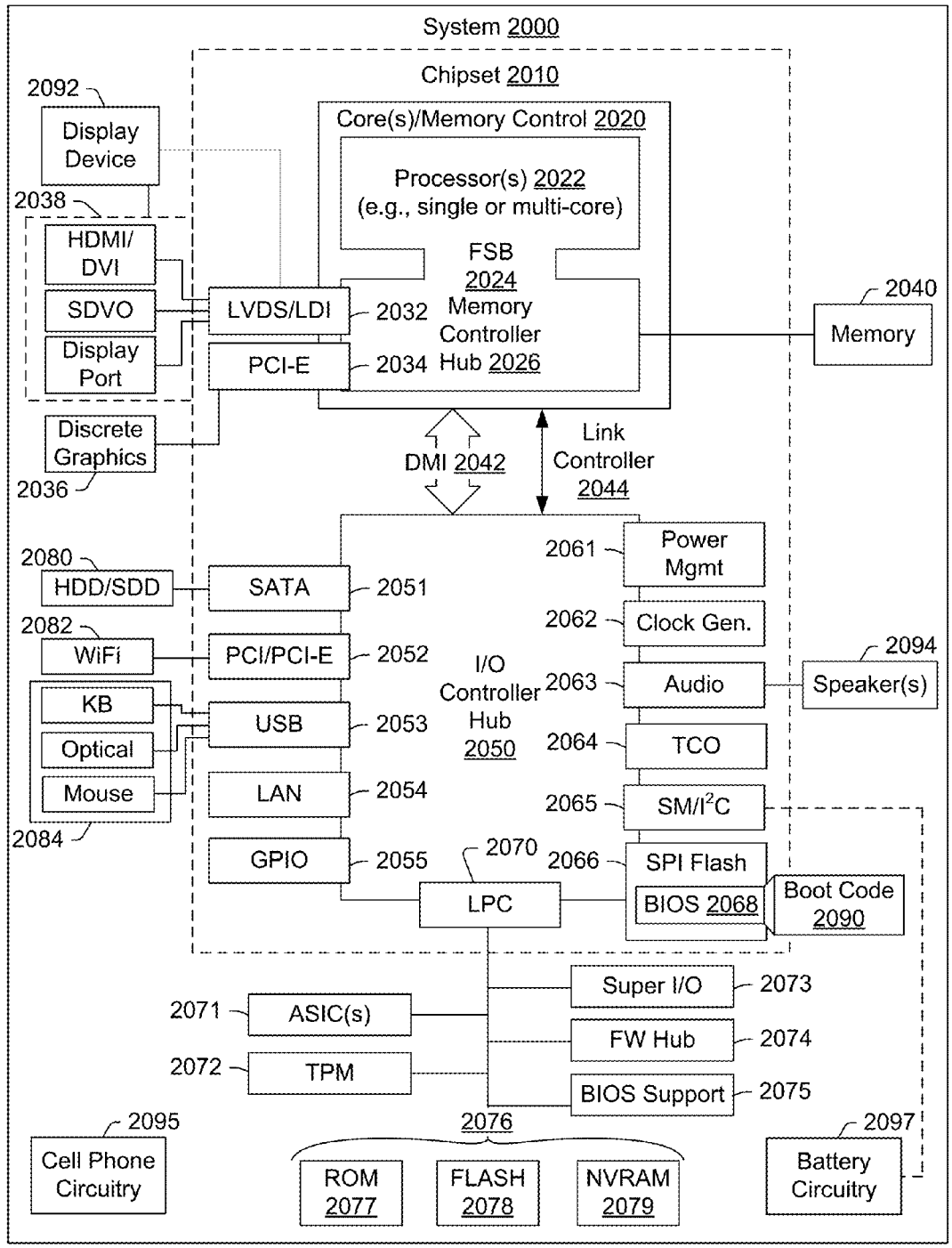
FIG. 10 is a diagram of an example of circuitry of a system, a device, etc.

While various examples of circuits or circuitry may be shown or discussed, FIG. 10 depicts a block diagram of an illustrative computer system 2000. The system 2000 may be a computer system, such as one of the ThinkCentre® or ThinkPad® series of personal computers sold by Lenovo (US) Inc. of Morrisville, N.C., or a workstation computer, such as the ThinkStation® workstation computer sold by Lenovo (US) Inc. of Morrisville, N.C.; however, as apparent from the description herein, a satellite, a base, a server or other machine may include other features or only some of the features of the system 2000 (e.g., consider the Think-Server® server sold by Lenovo (US) Inc. of Morrisville, N.C.).

As shown in FIG. 10, the system 2000 includes a so-called chipset 2010. A chipset refers to a group of integrated circuits, or chips, that are designed to work together. Chipsets are usually marketed as a single product (e.g., consider chipsets marketed under the brands INTEL®, AMD®, etc.).

In the example of FIG. 10, the chipset 2010 has a particular architecture, which may vary to some extent depending on brand or manufacturer. The architecture of the chipset 2010 includes a core and memory control group 2020 and an I/O controller hub 2050 that exchange information (e.g., data, signals, commands, etc.) via, for example, a direct management interface or direct media interface (DMI) 2042 or a link controller 2044. In the example of FIG. 10, the DMI 2042 is a chip-to-chip interface (sometimes referred to as being a link between a "northbridge" and a "southbridge").

The core and memory control group 2020 include one or more processors 2022 (e.g., single core or multi-core) and a memory controller hub 2026 that exchange information via a front side bus (FSB) 2024. As described herein, various components of the core and memory control group 2020 may be integrated onto a single processor die, for example, to make a chip that supplants the conventional "northbridge" style architecture.

The memory controller hub 2026 interfaces with memory 2040. For example, the memory controller hub 2026 may provide support for DDR SDRAM memory (e.g., DDR, DDR2, DDR3, etc.). In general, the memory 2040 is a type of random-access memory (RAM). It is often referred to as "system memory".

The memory controller hub 2026 further includes a low-voltage differential signaling interface (LVDS) 2032. The LVDS 2032 may be a so-called LVDS Display Interface (LDI) for support of a display device 2092 (e.g., a CRT, a flat panel, a projector, etc.). A block 2038 includes some examples of technologies that may be supported via the LVDS interface 2032 (e.g., serial digital video, HDMI/DVI, display port). The memory controller hub 2026 also includes one or more PCI-express interfaces (PCI-E) 2034, for example, for support of discrete graphics 2036. Discrete graphics using a PCI-E interface has become an alternative approach to an accelerated graphics port (AGP). For example, the memory controller hub 2026 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2050 includes a variety of interfaces. The example of FIG. 10 includes a SATA interface 2051, one or more PCI-E interfaces 2052 (optionally one or more legacy PCI interfaces), one or more USB interfaces 2053, a LAN interface 2054 (more generally a network interface), a general purpose I/O interface (GPIO) 2055, a low-pin count (LPC) interface 2070, a power management interface 2061, a clock generator interface 2062, an audio interface 2063 (e.g., for speakers 2094), a total cost of operation (TCO) interface 2064, a system management bus interface (e.g., a multi-master serial computer bus interface) 2065, and a serial peripheral flash memory/controller interface (SPI Flash) 2066, which, in the example of FIG. 10, includes BIOS 2068 and boot code 2090. With respect to network connections, the I/O hub controller 2050 may include integrated gigabit Ethernet controller lines multiplexed with a PCI-E interface port. Other network features may operate independent of a PCI-E interface.

The interfaces of the I/O hub controller 2050 provide for communication with various devices, networks, etc. For example, the SATA interface 2051 provides for reading, writing or reading and writing information on one or more drives 2080 such as HDDs, SDDs or a combination thereof. The I/O hub controller 2050 may also include an advanced host controller interface (AHCI) to support one or more drives 2080. The PCI-E interface 2052 allows for wireless connections 2082 to devices, networks, etc. The USB interface 2053 provides for input devices 2084 such as keyboards (KB), one or more optical sensors, mice and various other devices (e.g., microphones, cameras, phones, storage, media players, etc.). On or more other types of sensors may optionally rely on the USB interface 2053 or another interface (e.g., I²C, etc.).

In the example of FIG. 10, the LPC interface 2070 provides for use of one or more ASICs 2071, a trusted platform module (TPM) 2072, a super I/O 2073, a firmware hub 2074, BIOS support 2075 as well as various types of memory 2076 such as ROM 2077, Flash 2078, and non-volatile RAM (NVRAM) 2079. With respect to the TPM 2072, this module may be in the form of a chip that can be used to authenticate software and hardware devices. For example, a TPM may be capable of performing platform authentication and may be used to verify that a system seeking access is the expected system.

The system 2000, upon power on, may be configured to execute boot code 2090 for the BIOS 2068, as stored within the SPI Flash 2066, and thereafter processes data under the control of one or more operating systems and application software (e.g., stored in system memory 2040). An operating system may be stored in any of a variety of locations and accessed, for example, according to instructions of the BIOS 2068. Again, as described herein, a satellite, a base, a server or other machine may include fewer or more features than shown in the system 2000 of FIG. 10. Further, the system 2000 of FIG. 10 is shown as optionally including cell phone circuitry 2095, which may include GSM, CDMA, etc., types of circuitry configured for coordinated operation with one or more of the other features of the system 2000. As shown in FIG. 10, the system 2000 can include battery circuitry 2097.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a chassis that comprises a keeper that comprises a post and a cam contact surface;
    a board coupled to the chassis wherein the board comprises a power receipt connector and at least one processor electrically coupled to the power receipt connector;
    a power supply unit that comprises a power supply connector;
    a pivotable member coupled to the power supply unit wherein the pivotable member comprises a handle portion and a latch portion that comprises a groove and a cam surface wherein, in a latched orientation, the groove engages the post and secures the power supply connector to the power receipt connector and wherein, in a transitional orientation to an unlatched orientation, forcible contact between the cam surface and the cam contact surface disconnects the power supply connector from the power receipt connector; and
    a panel operatively coupled to the chassis wherein, in a closed orientation, the panel covers the pivotable member.

2. The system of claim 1 wherein the chassis comprises a recess defined in part by the cam contact surface and wherein the post that extends into the recess.

3. The system of claim 1 wherein, in the latched orientation, a surface of the handle portion defines at least in part a finger insert recess.

4. The system of claim 1 wherein the handle portion comprises a plane that, in the latched orientation, is substantially parallel to a planar wall of the power supply unit.

5. The system of claim 1 wherein the power supply unit comprises a power cable socket and wherein the chassis comprises an opening aligned with the power cable socket.

6. The system of claim 1 wherein the power supply unit comprises a fan that comprises a fan rotational axis and a fan face and wherein the chassis comprises at least one air flow opening disposed an axial distance from the fan face.

7. The system of claim 1 comprising a mount that mounts the pivotable member to the power supply unit.

8. The system of claim 1 wherein the power supply unit comprises a mount that pivotably couples the pivotable member to the power supply unit.

9. The system of claim 1 wherein the power receipt connector comprises a slot and electrical contacts disposed at least partially in the slot.

10. The system of claim 1 wherein the power supply connector comprises a plate and electrical contacts.

11. The system of claim 1 wherein the power receipt connector comprises a slot and wherein the power supply connector comprises a plate that, in the latched orientation, is at least partially received by the slot.

12. The system of claim 1 wherein, in the unlatched orientation, the handle portion of the pivotable member extends outwardly away from a wall of the power supply unit and wherein clearance exists between electrical contact surfaces of the power supply connector and electrical contact surfaces of the power receipt connector.

13. The system of claim 1 wherein the power supply unit comprises a graphics power supply connector.

14. The system of claim 13 comprising graphics circuitry mounted to the chassis wherein the graphics circuitry comprises a graphics power receipt connector and comprising a cable that extends from the graphics power supply connector to the graphics power receipt connector.

15. The system of claim 5 comprising a power cable that comprises a plug received by the power cable socket via the opening of the chassis wherein the plug received by the power cable socket limits movement of the power supply due to contact between the plug and a portion of the opening of the chassis.

16. A system comprising:
    a chassis that comprises a keeper that comprises a post and a cam contact surface;
    a board mounted to the chassis wherein the board comprises a board power receipt connector;
    a processor mounted to the board and electrically coupled to the power receipt connector;
    memory accessible by the processor, mounted to the board and electrically coupled to the power receipt connector;
    graphics circuitry mounted to the chassis wherein the graphics circuitry comprises a graphics power receipt connector;
    a power supply unit that comprises a board power supply connector and a graphics power supply connector; and
    a pivotable member coupled to the power supply unit wherein the pivotable member comprises a handle portion and a latch portion that comprises a groove and a cam surface wherein, in a latched orientation, the groove engages the post and secures the board power supply connector to the board power receipt connector and wherein, in a transitional orientation to an unlatched orientation, forcible contact between the cam surface and the cam contact surface disconnects the board power supply connector from the board power receipt connector.

17. The system of claim 16 comprising a cable that extends from the graphics power supply connector to the graphics power receipt connector.

18. A system comprising:
    a chassis that comprises a power cable socket opening, a post and a cam contact surface;
    a board coupled to the chassis wherein the board comprises a power receipt connector and at least one processor electrically coupled to the power receipt connector;
    a power supply unit that comprises a first lateral side that comprises a fan vent and a power cable socket, a second lateral side that comprises a fan vent, a front side, and a back side that comprises a power supply connector; and
    a pivotable member operatively coupled to the first and second lateral sides of the power supply unit wherein the pivotable member comprises a front side handle portion and a lateral side latch portion that comprises a groove and a cam surface wherein, in a latched orientation, the groove engages the post and secures the power supply connector to the power receipt connector and aligns the power cable socket of the power supply unit with the power cable socket opening of the chassis.

19. The system of claim 18 comprising a power cable that comprises a plug received by the power cable socket via the opening of the chassis wherein the plug received by the power cable socket limits movement of the power supply due to contact between the plug and a portion of the power cable socket opening of the chassis and wherein, in a transitional orientation to an unlatched orientation with the plug unplugged from the power cable socket, forcible contact between the cam surface and the cam contact surface disconnects the power supply connector from the power receipt connector.

20. A system comprising:
  a chassis that comprises a keeper that comprises a post and a cam contact surface;
  a board coupled to the chassis wherein the board comprises a power receipt connector and at least one processor electrically coupled to the power receipt connector;
  a power supply unit that comprises a power supply connector and a graphics power supply connector;
  a pivotable member coupled to the power supply unit wherein the pivotable member comprises a handle portion and a latch portion that comprises a groove and a cam surface wherein, in a latched orientation, the groove engages the post and secures the power supply connector to the power receipt connector and wherein, in a transitional orientation to an unlatched orientation, forcible contact between the cam surface and the cam contact surface disconnects the power supply connector from the power receipt connector.

21. The system of claim 20 comprising graphics circuitry mounted to the chassis wherein the graphics circuitry comprises a graphics power receipt connector and comprising a cable that extends from the graphics power supply connector to the graphics power receipt connector.

* * * * *